Figure 1:
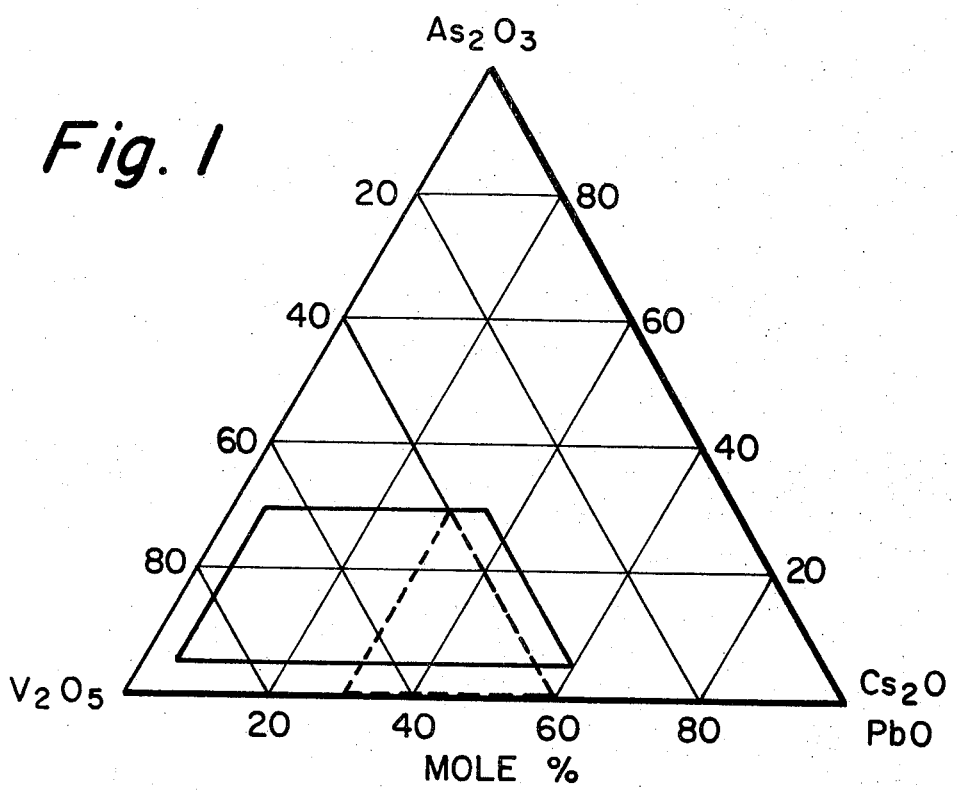

United States Patent
Malmendier et al.

[11] 3,837,866
[45] Sept. 24, 1974

[54] LOW MELTING VANADATE GLASSES

[75] Inventors: Joseph W. Malmendier; Joseph E. Sojka, both of Painted Post, N.Y.

[73] Assignee: Corning Glass Works, Corning, N.Y.

[22] Filed: Apr. 24, 1972

[21] Appl. No.: 247,118

[52] U.S. Cl............... 106/47 R, 252/518, 252/519, 252/520, 252/521
[51] Int. Cl.............................................. C03c 3/12
[58] Field of Search............ 106/47 Q, 47 R, 49, 50; 252/62.3 R, 518

[56] References Cited
UNITED STATES PATENTS

| | | | |
|---|---|---|---|
| 2,084,747 | 6/1937 | Rosenberg | 106/49 |
| 3,370,966 | 2/1968 | Schwartz | 106/49 |
| 3,385,915 | 5/1968 | Hamling | 106/50 |
| 3,408,212 | 10/1968 | Dumesnil | 106/47 R |

FOREIGN PATENTS OR APPLICATIONS

| | | | |
|---|---|---|---|
| 1,015,579 | 9/1957 | Germany | |
| 1,015,993 | 9/1957 | Germany | |
| 1,496,562 | 8/1969 | Germany | 106/47 R |

OTHER PUBLICATIONS

Stanworth et al.–Chemical Abstracts–Vol. 54, item 17831i.
Balta, R.–Chemical Abstracts–Vol. 67 (1967), item 16077z.
Rawson–Inorganic Glass-Forming Systems (1967), Academic Press, London & NYC, pp. 191-193.

*Primary Examiner*—Helen M. McCarthy
*Attorney, Agent, or Firm*—Clinton S. Janes, Jr.; Clarence R. Patty, Jr.

[57] ABSTRACT

Glasses are disclosed that melt at low temperatures in the range of 500°-900°C. and that are composed essentially of 25-85 percent by weight vanadium oxide, 5-60 percent lead and/or cesium oxide, and 5-45 percent arsenic oxide. The glasses may be adapted either for encapsulating and sealing electrical elements, or for the fabrication of semiconducting elements.

2 Claims, 3 Drawing Figures

LOW MELTING VANADATE GLASSES

This invention relates to vanadate glasses that melt at relatively low temperatures. It is particularly concerned with an additive that stabilizes, that is, inhibits uncontrolled devitrification in, lead and cesium vanadate glasses without substantially increasing the glass softening and melting temperatures. The resulting glasses may be either oxygen rich, or oxygen poor, depending on the batch ingredients selected and the manner of melting. Oxygen rich glasses may be employed as sealing glasses in the joining of ceramic and/or metal parts, and may also be used in the encapsulation of electrical and electronic components. Oxygen poor glasses have markedly lower resistivity values which enable them to be used in the fabrication of semiconducting elements.

There is a considerable body of knowledge extant in the glass and electrical arts regarding the use of glass, either in the glassy or in the devitrified form, to seal or join ceramic and/or metal parts. For example, U.S. Pat. No. 2,642,633, issued June 23, 1953 to R. H. Dalton, describes lead borosilicate glasses for producing glass seals between glass and/or metal parts, while U.S. Pat. No. 2,889,952, issued June 9, 1959 to S. A. Claypoole, describes lead zinc borate sealing glasses that thermally devitrify during or after sealing. More recently, these solder or soft sealing glasses have found extended application as encapsulations for electronic components such as integrated circuits. Glasses used for this purpose, and the process of applying such glasses, are described in detail by D. W. A. Forbes in an article entitled, "Solder Glass Seals in Semi-conductor Packaging," in Glass Technology, Vol. 8 (2), pp. 32-42 (1967).

Commercial sealing glasses of the type described by Dalton and Claypoole, as well as simple lead borate glasses, are widely used, but this use is limited by their application temperatures. While such glasses provide satisfactory seals, the temperatures required to insure hermetic sealing or encapsulation are prohibitive for certain purposes. It is of course well known that many electronic components are quite sensitive to even moderately elevated temperatures. Chalcogenide glasses have been proposed as a solution to the problem of lower temperature glass application. However, these glasses have generally proven difficult to handle and apply to a surface.

A basic purpose of the present invention is to meet the apparent need in the electrical art for an improved low melting sealing glass. A more specific purpose is to provide soft sealing glasses that have utility at lower temperatures than the borate type glasses presently in commercial use. A particular purpose is to provide such a sealing glass wherein the crystallization temperature of the glass is sufficiently removed from the glass softening point that the glass can be maintained in the glassy state without uncontrolled crystallization occurring during a sealing process.

It has previously been recognized that soft or low melting glasses can be produced by melting together the oxides of lead and vandium over a portion of their binary composition range that includes the eutectic at $1PbO : 1V_2O_5$. Rawson reports, on page 192 of his text "Inorganic Glass Forming Systems" (1967) Academic Press, that Denton et al, prepared binary vanadate glasses of different types. These included a series of lead vanadate glasses within the composition limits of 54-38 percent by weight lead oxide and 46-62 percent by weight vanadium oxide upon which a study of the electrical properties was conducted. MacKenzie also reports, on pages 131-132 of his text "Modern Aspects of the Vitreous State," Vol. III (1964) Butterworths, that a $Fe_2O_3$-$PbO$-$V_2O_5$ glass has been made and that its electrical properties have been studied. However, writers in this field indicate that most of the studies concerning vanadate glasses have been made on $V_2O_5$-$P_2O_5$ type glasses.

The present invention is based on the addition of an oxide of arsenic to lead and cesium vanadate melts. These melts are in the vicinity of the $PbO:V_2O_5$ binary eutectic which crystallizes at about 480°C. and the $Cs_2O$-$V_2O_5$ eutectic existing, in terms of mole percent, at 40 percent $Cs_2O$ and 60 percent $V_2O_5$ which has a crystallization temperature of 380°C. However, neither eutectic melt could be cooled to a glass and measurements made thereon utilizing normal glassmaking procedures. The arsenic oxide addition to either a lead or cesium vanadate composition provides several salutary effects. First, it tends to increase the difference between the glass softening point temperature and the temperature at which crystallization will occur when the glass is reheated during a forming operation. This stabilizes the glass and provides a wider temperature area or zone within which a glass can be formed and subsequently used without danger of uncontrolled crystallization occurring. Further, it provides a broader composition area within which glasses can be successfully produced. Finally, the glasses, being stable, are suitable for sealing glass use.

The present invention is a low melting vanadate glass having a composition, as calculated in weight percent from the glass batch on the oxide basis in terms of $Cs_2O$, $PbO$, $As_2O_3$ and $V_2O_5$, consisting essentially of 25-85 percent by weight $V_2O_5$, 5-60 percent by weight $Cs_2O$ and/or $PbO$, 5 to 45 percent $As_2O_3$, and 0-15 percent of $B_2O_3$, $Sb_2O_3$, $Tl_2O_3$, $TeO_2$, $SeO_2$, $Ag_2O$, $TiO_2$, $Bi_2O_3$, $Fe_2O_3$, $HgO$, and $SnO_2$. In the absence of cesium, the glass consists essentially of 35-60 percent $V_2O_5$, 25-60 percent $PbO$, 5-30 percent $As_2O_3$, and 0-15 percent of optional ingredients. In the absence of lead, the glass consists essentially of 35-80 percent $V_2O_5$, 5-55 percent $Cs_2O$, 5-25 percent $As_2O_3$, and 0-15 percent of optionals.

A small addition of an oxide of arsenic tends to stabilize a lead or cesium vanadate melt by enlarging the difference between the crystallization and softening points. As the arsenic oxide content is increased, however, the coefficient of thermal expansion increases and the arsenic oxide content should not exceed 45 percent in any event.

The glass softening point as well as coefficient of thermal expansion decreases with increasing content of vanadium oxide. However, it becomes increasingly difficult to maintain a stable valence or oxide level, and hence a stable melt, as the $V_2O_5$ content increases.

An increase in either cesium or lead content tends to increase the coefficient of thermal expansion. Also, glasses with a high cesium content tend to be hygroscopic. Accordingly, the contents of these constituents should be limited as indicated. In general, a lead oxide glass is preferred where coefficient of thermal expansion is a factor since the lead glasses tend to have lower expansion coefficients.

The various optional oxides have little effect on the present glasses provided their content is limited as indicated. The halides, when used in substantial amount, tend to soften the glass, but also substantially increase the coefficient of expansion. Other common glassmaking oxides, such as $SiO_2$, $P_2O_5$, and $Al_2O_3$, should generally be avoided, except in trace amounts. Likewise, a characteristic of the present glasses is essential freedom from the more common and relatively mobile alkali metals, lithium, sodium, and potassium.

Figure 2:
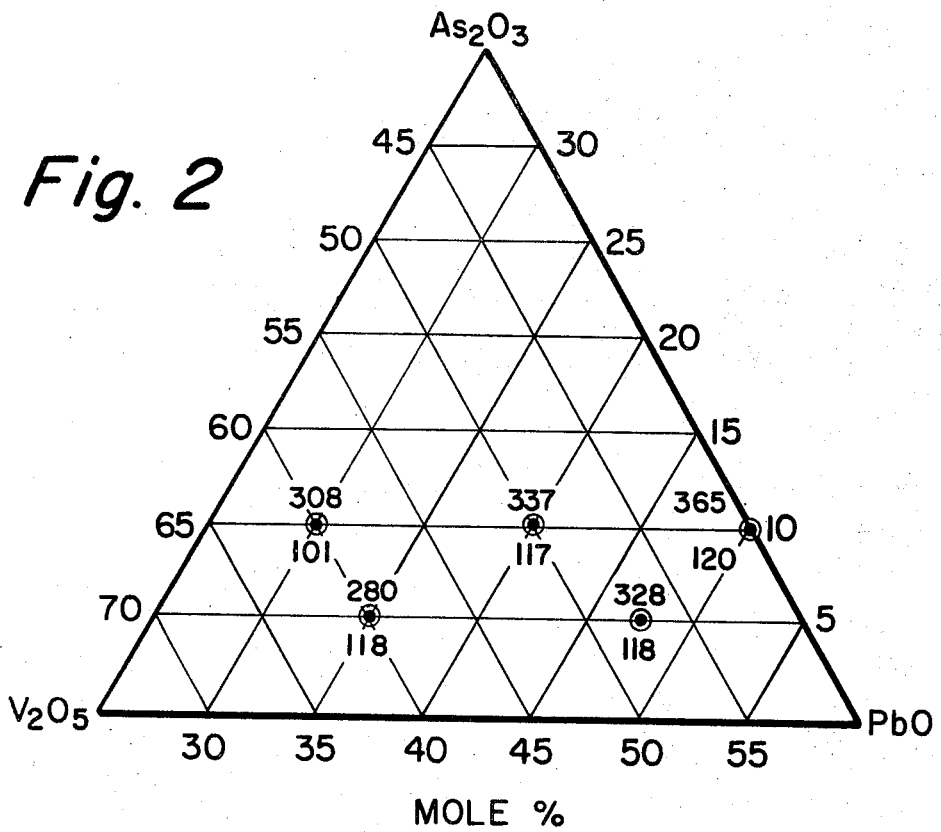
Figure 3:
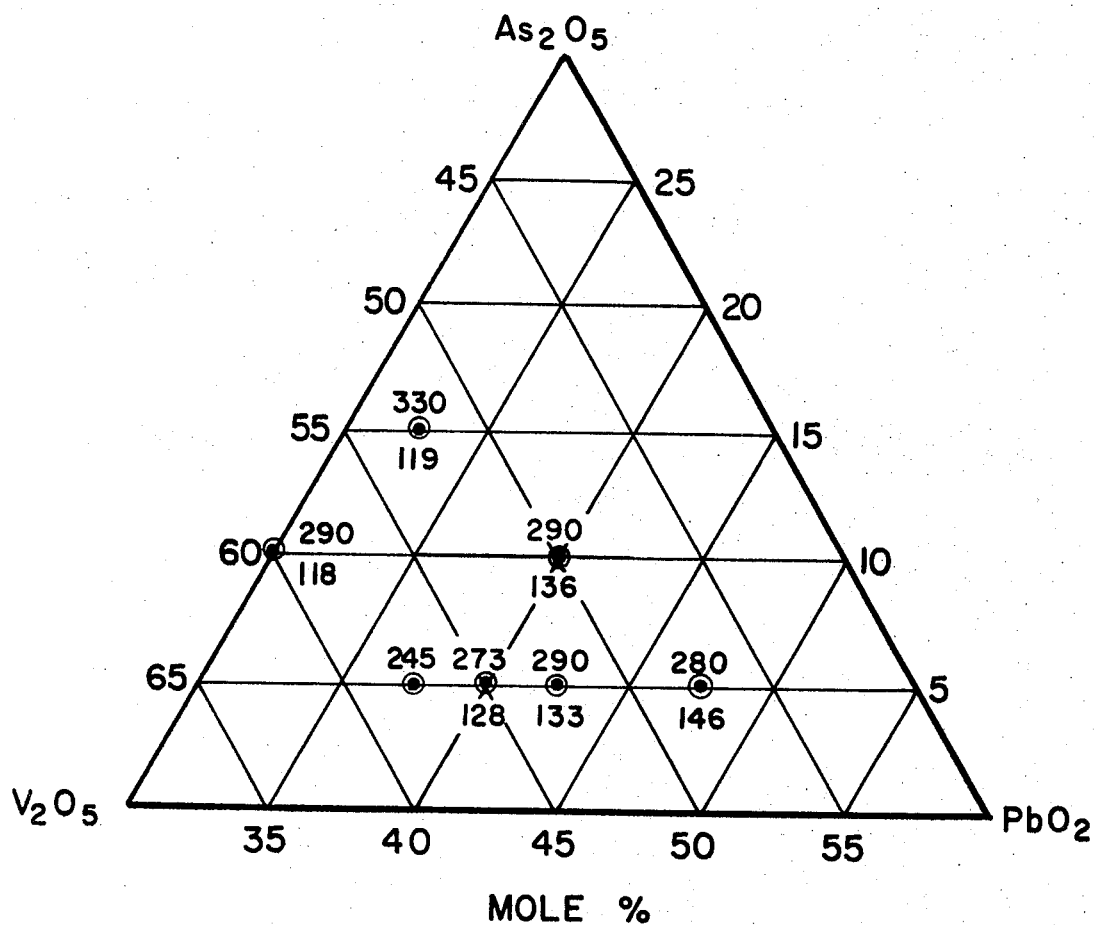

The invention is further described with reference to the accompanying drawing wherein, FIG. 1 is a ternary diagram of the $PbO-As_2O_3-V_2O_5$ composition system, and FIGS. 2 and 3 are enlarged partial ternary diagrams for batch systems for production of glasses within a portion of FIG. 1.

FIG. 1 shows in solid lines that portion of the lead oxide-arsenic oxide-vanadium oxide system that has been found particularly useful for present purposes. FIGS. 2 and 3 represent alternative batch systems for producing glasses within that portion of FIG. 1 shown in dotted lines. FIG. 2 is based on the $PbO-As_2O_3-V_2O_5$ batch system, while FIG. 3 shows a corresponding portion of the $PbO_2-As_2O_5-V_2O_5$ batch system. Each point enclosed in a circle on the graphical illustrations illustrates a glass batch of corresponding oxide composition. The data adjacent these points indicate (1) the softening point of the resulting glass in degrees C. and (2) the coefficient of thermal expansion in units/degree C. $\times 10^7$.

Property measurements made on such comparative glasses demonstrate that, in general, the coefficient of thermal expansion increases and the softening point of the glass decreases as the oxygen content of the glass increases. Thus, a higher oxygen content glass may be achieved by employing $PbO_2$ (rather than $PbO$) and/or $As_2O_5$ (rather than $As_2O_3$) in the glass batch composition. Likewise, a higher oxygen content may be insured in a glass by employing oxidizing melting conditions such as through the use of nitrates as batch materials and/or the use of an oxygen enriched atmosphere over the crucible during melting. The latter is particularly important where longer melting times are employed because there is a marked tendency for vanadium oxide to lose oxygen and change from the pentavalent ($V_2O_5$) state to the trivalent ($V_2O_3$) state.

Conversely, the use of lower oxides ($PbO$ or $As_2O_3$) in the glass batch and/or the use of reducing conditions during melting leads to a glass having a higher softening point and a lower coefficient of thermal expansion. Such conditions, however, also decrease the electrical resistivity of a glass. Therefore, physical properties in the present glasses may be selectively varied and controlled by controlling the level of oxygen supplied by the batch materials, the melting atmosphere, or both oxygen sources, during the melting process.

In the present glasses, the various cations may be introduced into the glass in different valence or oxidation states, e.g. $PbO$ or $PbO_2$ as indicated above. Likewise, they may be introduced as the nitrite, nitrate, or other compound form, depending on the oxygen level desired. Finally, they may be introduced in part at least as the fluoride or chloride. In substantial amounts, a halide softens the glass, but also raises the coefficient of thermal expansion. As a matter of convenient reference, however, glass compositions are calculated in oxide form in terms of the oxides $PbO$, $As_2O_3$, and $V_2O_5$ regardless of the chemical nature or degree of anion content.

The present glasses may be treated in accordance with standard or conventional practices for sealing applications. Thus, they may be reduced to a fine state of subdivision and mixed with a suitable vehicle or carrier. If desired, preformed sealing buttons or gaskets may be formed. For encapsulation, the component may be coated by brushing or spraying. Alternatively, it may be immersed in a slurry of the glass. Finally, where the coefficient of expansion is too high, the glass may be mixed with an inert additive such as zircon ($ZrSiO_4$) in accordance with the practice described in U.S. Pat. No. 3,258,350 granted June 28, 1966 to F. W. Martin and F. Zimar.

The invention is further described with reference to specific exemplary compositions, several of which are set forth in Tables I, II, and III in mole percent and in percent by weight as calculated from the glass batch. Table I sets forth compositions for lead vanadate glasses modified by addition of an arsenic oxide; Table II does the same for cesium vanadate glasses; Table III sets forth illustrative compositions of lead-cesium-arsenic-vanadate type glasses. Table I also gives batch compositions in mole percent to further illustrate the manner in which properties vary between oxygen rich and oxygen poor glasses. In addition to composition data, measurements in °C. are given for the glass annealing point ($T_A$), softening point ($T_F$), crystallization point ($T_C$), melting point ($T_M$); also, average coefficient of thermal expansion over the range 25°–150°C. (Exp. $\times 10^7$/°C.).

TABLE I

|  | 1 | 2 | 3 | 4 | 5 | 6 | 7 | 8 |
|---|---|---|---|---|---|---|---|---|
|  |  |  |  | Batch in Mole % |  |  |  |  |
| $V_2O_5$ | 47.5 | 47.5 | 60.0 | 60.0 | 60.0 | 50.0 | 50.0 | 50.0 |
| $As_2O_3$ | 5.0 | — | 10.0 | — | — | — | 25.0 | — |
| $As_2O_5$ | — | 5.0 | — | 10.0 | 10.0 | 25.0 | 13 | 25.0 |
| $PbO$ | 47.5 | — | 30.0 | 30.0 | — | 25.0 | — | — |
| $PbO_2$ | — | 47.5 | — | — | 30.0 | — | 25.0 | 25.0 |
|  |  |  |  | Glass in Mole % |  |  |  |  |
| $V_2O_5$ | 47.5 | 47.5 | 60.0 | 60.0 | 60.0 | 50.0 | 50.0 | 50.0 |
| $As_2O_3$ | 5.0 | 5.0 | 10.0 | 10.0 | 10.0 | 25.0 | 25.0 | 25.0 |
| $PbO$ | 47.5 | 47.5 | 30.0 | 30.0 | 30.0 | 25.0 | 25.0 | 25.0 |
|  |  |  |  | Glass in Weight % |  |  |  |  |
| $V_2O_5$ | 42.7 | 42.7 | 55.7 | 55.7 | 55.7 | 46.4 | 46.4 | 46.4 |
| $As_2O_3$ | 4.9 | 4.9 | 10.1 | 10.1 | 10.1 | 25.2 | 25.2 | 25.2 |
| $PbO$ | 52.4 | 52.4 | 34.2 | 34.2 | 34.2 | 28.4 | 28.4 | 28.4 |

TABLE I – Continued

|  | 1 | 2 | 3 | 4 | 5 | 6 | 7 | 8 |
|---|---|---|---|---|---|---|---|---|
|  |  |  |  | Properties |  |  |  |  |
| $T_A$ | 265 | 245 | 267 | 255 | 260 | 285 | 350 | 295 |
| $T_F$ | 328 | 280 | 308 | 290 | 290 | 335 | 400 | 350 |
| $T_C$ | 365 | 295 | 323 | 310 | 315 | 360 | 410 | 393 |
| $T_M$ | 468 | 440 | 507 | 530 | 475 | 540 | 570 | 560 |
| Exp. $\times 10^7$ /°C. | 118 | 146.4 | 101 | 114.3 | 117.9 | 73.4 | 93.8 | 105.4 |

TABLE II

|  | 1 | 2 | 3 | 4 | 5 | 6 | 7 | 8 |
|---|---|---|---|---|---|---|---|---|
|  |  |  |  | Mole % |  |  |  |  |
| $V_2O_5$ | 45 | 55 | 75 | 55 | 65 | 45 | 45 | 75 |
| $Cs_2O$ | 30 | 30 | 10 | 40 | 20 | 30 | 30 | 5 |
| $As_2O_3$ | 25 | 15 | 15 | 5 | 15 | 15 | 15 | 20 |
| $Sb_2O_3$ | — | — | — | — | — | 10 | — | — |
| HgO | — | — | — | — | — | — | 10 | — |
|  |  |  |  | Weight % |  |  |  |  |
| $V_2O_5$ | 37.9 | 46.7 | 70.2 | 44.9 | 57.9 | 36.3 | 37.6 | 71.8 |
| $Cs_2O$ | 39.2 | 39.5 | 14.5 | 50.7 | 27.6 | 37.5 | 38.8 | 7.4 |
| $As_2O_3$ | 22.9 | 13.8 | 15.3 | 4.4 | 14.5 | 13.2 | 13.6 | 20.8 |
| $Sb_2O_3$ | — | — | — | — | — | 13.0 | — | — |
| HgO | — | — | — | — | — | — | 10.0 | — |
|  |  |  |  | Properties |  |  |  |  |
| $T_A$ | 290 | 250 | 280 | 130 | 270 | 270 | 320 | 285 |
| $T_F$ | 355 | 290 | 300 | 200 | 310 | 335 | 380 | 330 |
| $T_C$ | 385 | 360 | 330 | 220 | 330 | 350 | 420 | 365 |
| $T_M$ | 440 | 450 | 480 | 330 | 500 | 440 | 530 | 495 |
| Exp. $\times 10^7$ /°C. | 173 | 174 | — | — | — | — | — | — |

TABLE III

|  | 1 | 2 | 3 | 4 | 5 |
|---|---|---|---|---|---|
|  |  |  | Mole % |  |  |
| $V_2O_5$ | 55 | 55 | 55 | 55 | 55 |
| $As_2O_3$ | 15 | 15 | 15 | 15 | 15 |
| PbO | — | 30 | 15 | 10 | 20 |
| $Cs_2O$ | 30 | — | 15 | 20 | 10 |
|  |  |  | Weight % |  |  |
| $V_2O_5$ | 46.7 | 50.9 | 48.7 | 48.0 | 49.4 |
| $As_2O_3$ | 13.8 | 15.1 | 14.4 | 14.2 | 14.7 |
| PbO | — | 34.0 | 16.3 | 10.7 | 22.0 |
| $Cs_2O$ | 39.5 | — | 20.6 | 27.1 | 13.9 |
|  |  |  | Properties |  |  |
| $T_A$ | 250 | 320 | 270 | 245 | 290 |
| $T_F$ | 290 | 380 | 340 | 310 | 370 |
| $T_C$ | 360 | 405 | 390 | 350 | 395 |
| $T_M$ | 450 | 545 | 510 | 500 | 520 |
| Exp. (25–150°C) $\times 10^7$ | 173.8 | — | — | — | — |

Glass batches corresponding to these compositions may be prepared by thoroughly mixing together conventional glassmaking ingredients in suitable proportions. Among the various ingredients that may be employed are nitrates, nitrites, oxides, chlorides, and fluorides of lead, cesium, arsenic, vanadium, and the optionals. The selection of batch materials, as well as the selection of melting conditions, depends on the characteristics desired in the glass. Thus, if a glass having low resistivity is desired for semiconducting purposes, conditions favoring a low oxygen content in the glass will be selected. These include selecting $As_2O_3$ and PbO as batch ingredients and the use of reducing conditions during melting of the glass. In contrast, when a minimum softening point is of paramount importance, oxidizing conditions are selected such as the choice of $PbO_2$ and $As_2O_5$ as batch ingredients and the use of oxidizing conditions during melting.

A glass batch based on each composition was prepared as described above, placed in a silica crucible and melted at a temperature within the range of 500°–900°C. for a time within the range of 15–30 minutes. The molten glass was then poured onto a graphite plate and the cast slab placed in an annealing oven.

The coefficient of thermal expansion and the electrical resistivity were measured on the annealed glass samples. Also, a number of significant thermal measurements were made in accordance with the well-known Differential Thermal Analysis technique (see, for example, a publication by T. H. Ramsey at pp. 671–5 of the Ceramic Bulletin, Vol. 50, No. 8 (1971)). These included the annealing point, the softening point, the melting point, and the crystallization point of the glass. Several of the glass samples were then heat treated to effect thermal devitrification of the glass, that is, controlled crystallization throughout the body of the glass. Thereafter, the coefficient of thermal expansion and electrical resistivity were measured on the devitrified sample. In general, the devitrified glasses showed considerably lower values for both the coefficient of expansion and the resistivity, thus making such thermally devitrified materials useful for conducting purposes.

By way of specific example, test pieces of the first glass in Table I were heat treated at 460°C. for 30 minutes to devitrify the glass. The coefficient of thermal expansion was then found to be $88 \times 10^{-7}$/°C. over the range 25°–150°C. The electrical resistivity was also measured at room temperature and Log R was 1.56 in contrast to 5.92 for the glass before devitrification. Similar tests showed that the coefficient of thermal expansion of glass 3 in Table I dropped to $61.6 \times 10^{-7}$/°C. and that of glass 8 to $72.0 \times 10^{-7}$/°C. after devitrification by heat treatment.

Several additional glass melts were made in the manner described above to compare the effect of various oxides as additives in two typical lead vanadate binary glass batches. The two series of batches, in mole percent, were composed of (1) 47.5 percent $V_2O_5$, 47.5 percent PbO, and 5 percent additive oxide, and (2) 47.5 percent $V_2O_5$, 47.5 percent $PbO_2$, and 5 percent additive oxide. Glass properties, including softening point, annealing point, crystallization point, and coefficient of thermal expansion were measured as described earlier. The data thus obtained are set forth in Table IV with each of the glasses being identified by the oxide additive to the batch.

TABLE IV

| Additive | None | | $As_2O_3$ | | $As_2O_5$ | | $B_2O_3$ | |
|---|---|---|---|---|---|---|---|---|
| Base Glass Properties | 1 | 2 | 1 | 2 | 1 | 2 | 1 | 2 |
| $T_F$(°C.) | — | 230 | 328 | 300 | 292 | 280 | 275 | 275 |
| $T_C$(°C.) | — | 245 | 365 | 330 | 320 | 295 | 298 | 300 |
| Exp.×$10^7$ (25–150°C.) | — | — | 118 | 146 | 138 | 146 | 140 | 146 |

| Additive | $SiO_2$ | | $Bi_2O_3$ | | $Tl_2O_3$ | | $TeO_2$ | |
|---|---|---|---|---|---|---|---|---|
| Base Glass Properties | 1 | 2 | 1 | 2 | 1 | 2 | 1 | 2 |
| $T_F$(°C.) | 260 | — | — | — | — | — | 270 | 265 |
| $T_C$(°C.) | 270 | — | — | — | — | — | 290 | 280 |
| Exp.×$10^7$ (25–150°C.) | — | — | — | — | — | — | 147 | 156 |

The blank spaces indicate that a glass could not be produced, or that the melt crystallized so rapidly on cooling that an expansion bar could not be cast. It would appear that $B_2O_3$ is an effective additive. However, the expansion coefficients of the $B_2O_3$ glasses are high and, furthermore, their chemical durability is so poor as to render them subject to attack by atmospheric moisture. Such glasses would, obviously, have little, if any, practical utility.

Several further melts were made in the same manner to demonstrate the effect of an optional fourth component in the glasses of the present invention. The base glass was glass 1 of Table I having the following composition in mole percent: 47.5 percent $V_2O_5$, 47.5 percent PbO, and 5 percent $As_2O_3$. Each of the recited glass batches was composed of 100 parts of such base glass batch with 5 mole percent of the indicated fourth component added thereto. Table V identifies each glass in the series by the additive fourth component and sets forth the coefficient of thermal expansion, as well as the various properties measured by DTA measurements:

TABLE V

| | 1 | 2 | 3 | 4 | 5 |
|---|---|---|---|---|---|
| | Base | $SnO_2$ | $Bi_2O_3$ | $Sb_2O_5$ | $TiO_2$ |
| $T_A$ | 265 | 270 | 300 | 290 | 280 |
| $T_F$ | 328 | 325 | 350 | 350 | 325 |
| $T_C$ | 365 | 365 | 370 | 395 | 360 |
| $T_M$ | 468 | 500 | 510 | 500 | 500 |
| Exp.×$10^7$ (25–150°C.) | 118 | — | — | — | — |
| | 6 | 7 | 8 | 9 | 10 |
| | $Ag_2CO_3$ | $AgNO_3$ | AgBr | $HgCL_2$ | $BaCl_2$ |
| $T_A$ | 260 | 240 | 280 | 250 | 280 |
| $T_F$ | 320 | 280 | 335 | 305 | 335 |
| $T_C$ | 340 | 300 | 355 | 345 | 390 |
| $T_M$ | 510 | 425 | 470 | 450 | 480 |
| Exp.×$10^7$ (25–150°C.) | 131 | 140 | 132 | 130 | — |
| | 11 | 12 | 13 | 14 | |
| | $Tl_2O_3$ | $TeO_2$ | $SeO_2$ | $Fe_2O_3$ | |
| $T_A$ | 245 | 280 | 280 | 320 | |
| $T_F$ | 290 | 345 | 350 | 380 | |
| $T_C$ | 340 | 385 | 385 | 410 | |
| $T_M$ | 430 | 480 | 480 | 520 | |

We claim:

1. A low melting vanadate glass having a composition, in weight percent as calculated on the oxide basis in terms of $Cs_2O$, $As_2O_3$, and $V_2O_5$, consisting essentially of 5–55 percent $Cs_2O$, 5–25 percent $As_2O_3$, and 35–80 percent $V_2O_5$, said glass being essentially free from $SiO_2$, $P_2O_5$, $Al_2O_3$, $Li_2O$, $Na_2O$, and $K_2O$.

2. A low melting vanadate glass according to claim 1 wherein said composition also contains up to 15 percent by weight total of the following metals, expressed in terms of the stated oxide, $B_2O_3$, $Sb_2O_3$, $Tl_2O_3$, $TeO_2$, $SeO_2$, $Ag_2O$, $TiO_2$, $Fe_2O_3$, $Bi_2O_3$, HgO, BaO, and $SnO_2$.

* * * * *